Figure 1:
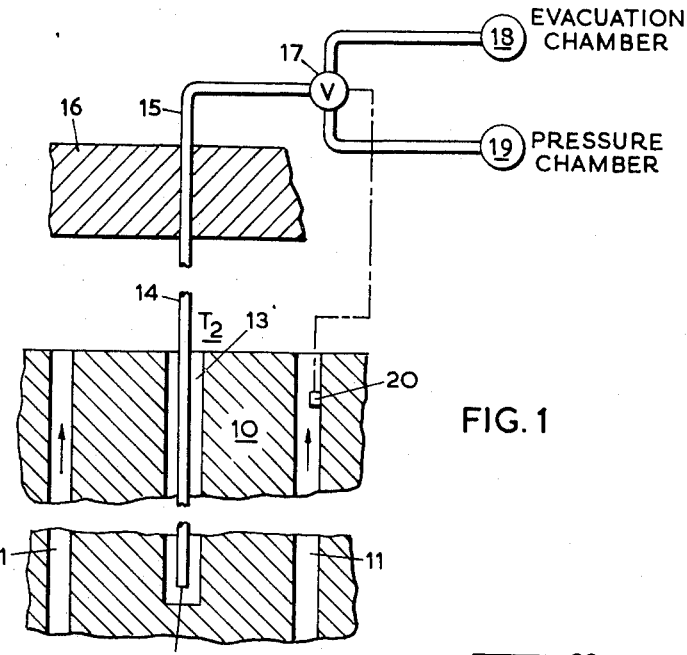

May 17, 1966

T. O. JEFFRIES ETAL 3,251,746

NUCLEAR REACTOR CONTROL MEANS

Filed Sept. 27, 1963

United States Patent Office 3,251,746
Patented May 17, 1966

3,251,746
NUCLEAR REACTOR CONTROL MEANS
Thomas Oliver Jeffries, Everett Long, and Robert Walter Smyth, Whetstone, England, assignors to The English Electric Company Limited, Strand, London, England, a British company
Filed Sept. 27, 1963, Ser. No. 312,166
Claims priority, application Great Britain, Oct. 10, 1962, 38,413/62
2 Claims. (Cl. 176—22)

The invention relates to nuclear reactors.

According to the invention, a nuclear reactor has a reactivity control system which includes closed gas-containing means at least part of which is contained within the moderator core of the reactor, and neutron-absorbing control gas within the gas-containing means.

According to a preferred feature of the invention, the reactivity control system includes means for causing the density of the control gas in the portion of the gas-containing means within the moderator core to vary in response to changes in conditions in the reactor, so as to cause corresponding changes in the rate of absorption of neutrons by the control gas to take place whereby to tend to nullify the said changes in reactor conditions.

According to one aspect of the invention, the said means for causing control gas density to vary include two reservoirs outside the core and arranged to contain control gas under substantially different pressures from each other, valve means arranged to connect the said reservoirs separately to the portion of the gas containing means within the core, and valve-operating means for controlling the position of the valve means in response to variations in reactor conditions whereby to admit control gas to, or remove control gas from, the said portion of the gas-containing means so as to cause the density of the gas to vary.

The valve-operating means may be responsive to changes in neutron flux or in temperature, or to any convenient parameter in the reactor. Where the reactor is of the boiling water type, and is arranged to supply steam to a steam turbine through a stop valve, the valve operating means may include means for giving an electrical output signal in response to steam pressure on the stop valve, and valve-actuating means responsive to changes in said output signal.

According to another aspect of the invention, the closed gas-containing means includes a first vessel arranged within the moderator core, a second vessel of heat-conducting material and arranged adjacent the reactor cooling-fluid outlet from the core, and duct means connecting the two said vessels, so that variation in the temperature of the reactor cooling fluid in the vicinity of the outlet of the said cooling fluid from the moderator core induces corresponding variations in the temperature of the control gas within the second vessel whereby to change the density of the control gas within the second vessel, in the duct means and in the first vessel.

Figure 2:
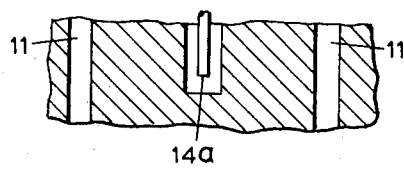
Figure 2:
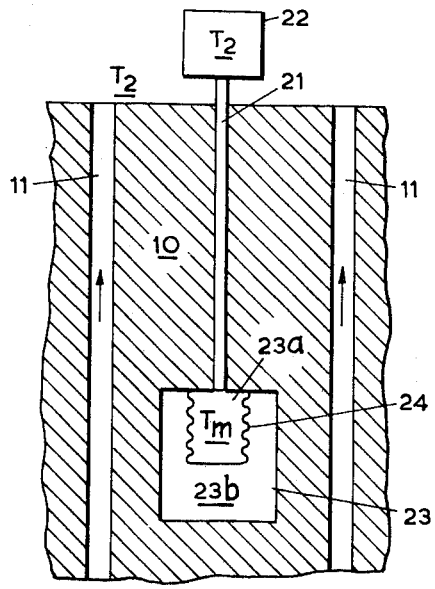

Nuclear reactors according to the invention in two alternative forms will now be described by way of example and with reference to the accompanying drawings, of which:

FIG. 1 is a diagrammatic sectional elevation showing part of the moderator core of a gas-cooled nuclear reactor according to one aspect of the invention; and FIG. 2 is a diagrammatic sectional elevation showing part of the moderator core of a gas-cooled nuclear reactor according to another aspect of the invention.

With reference firstly to FIG. 1, the reactor has a core comprising a solid moderator 10, in which there are formed a number of vertical fuel channels 11, containing fuel elements (not shown): when the reactor is in use, coolant gas is passed up the channels as indicated by the arrows in FIG. 1. A number of channels 13 are formed in the moderator core 10: in each channel 13 there is inserted a control-gas tube 14, which is closed at its lower end 14a. The upper end of each tube 14 communicates with a pipe 15 passing out through a biological shield 16 of the reactor, and is connected through a control valve 17 to an evacuation chamber 18 and a pressure chamber 19. The valve 17 has three positions in which the pipe 15 is connected respectively to (1) the evacuation chamber 18; (2) the pressure chamber 19; or (3) to neither chamber. The connections to chambers 18 and 19 in the valve 17 incorporate means for varying the restriction to flow: the chambers 18 and 19, together with the pipe 15 and control-gas tube 14, are filled with boron trifluoride control-gas of various densities. The valve 17 is operated by an actuating device such as a servo unit (not shown) which is connected to, and is responsive to signals from, a thermocouple 20 situated in the cooling-gas outlet end of a fuel channel 11 in the core.

In operation, a rise in the coolant gas outlet temperature $T_2$, directed by the thermocouple 20, causes the valve 17 to open the pipe 15 to the pressure chamber 19, in which the gas pressure is maintained by a compressor (not shown) at a value higher than that of the gas in the pipe 15. The pressure in the pipe 15, and hence in the control-gas tube 14, increases: in consequence the rate of absorption of neutrons by the control gas increases, and this tends to reduce the coolant gas outlet temperature $T_2$. As the latter decreases, a signal from the thermocouple 20 causes the valve 17 to close the connection between pipe 15 and pressure chamber 19, and then to open that between pipe 15 and the evacuation chamber 18, the pressure of the gas in the chamber 18 being maintained at a lower value than that in the pipe 15. The degree of opening of the valve 17, and hence the rate of change of pressure in the pipe 15, is preferably dependent on the rate of change of the coolant-gas outlet temperature $T_2$. As the pressure of control-gas in the pipe 15 and tube 14 decreases, the rate of neutron absorption decreases and the decrease in temperature $T_2$ is thus halted.

As is illustrated by the foregoing, whatever changes occur in the temperature $T_2$, the density (and hence the reactivity) of the control-gas in the reactor core will automatically change so as to tend to nullify the changes in the temperature $T_2$.

The valve 17 may also be used in initiating any desired change in reactor conditions: for example, if an increase in the coolant-gas outlet temperature $T_2$ is required during starting-up of the reactor, the valve 17 may be operated with either manual or automatic control so as to cause the density of control gas in the core to decrease until the required temperature is obtained. Similarly, to provide some protection for the reactor, the valve 17 can, if desired, be connected with reactor safety circuits in such a way that failure of a component, or loss of control of some variable quantity in the reactor, causes the valve to open fully so as to shut down the reactor as quickly as possible by flooding the moderator core with neutron-absorbing gas. As an ancillary method, steel balls may also be dropped, by suitable means, into the control gas system in order to increase the mass of neutron absorbing material.

With reference now to FIG. 2, the reactor again has a core comprising a solid moderator 10, in which there are formed a number of vertical fuel channels 11 containing fuel elements (not shown): when the reactor is in use, coolant gas is passed up the channels 11 as indicated by the arrows in FIG. 2. A number of control-gas tubes, one of which is shown at 21, are inserted in the upper half of the core, the upper end of each tube 21 passing through a channel of the core and communicating with a steel vessel 22 which is situated adjacent the outlet ends of the fuel channels. The lower end of each tube 21 communicates with another vessel 23 in the vicinity of the horizontal centre plane of the core. The vessel 23 contains a bellows 24 dividing the vessel into two chambers 23a and 23b, of which only the chamber 23a communicates with the control-gas tube 21. The vessel 22, tube 21 and chamber 23a contain boron trifluoride control gas, the purpose of which is to absorb neutrons and so act as a reactivity control medium; the chamber 23b contains carbon dioxide gas. Each tube 21 and its two associated vessels 22 and 23 are sealed off as a unit so that they constitute together a closed system.

In operation, the temperature of the control-gas in the upper vessel 22 is substantially the same as the outlet temperature $T_2$ of the coolant gas leaving the fuel channel 11, and the temperature $T_m$ of the gas in the chambers 23a and 23b is substantially constant. An increase in the outlet temperature $T_2$ causes the pressure of the control-gas to increase; and consequently the mass of control-gas in the chamber 23a also increases. This in turn causes the control-gas to absorb neutrons at an increased rate, thus decreasing the reactivity of the reactor. The effect of this is to tend to lower the gas outlet temperature and hence, in turn, the rate of neutron absorption by the control-gas. The reverse applies if the gas outlet temperature $T_2$ decreases. This system is again one which tends to nullify the change in temperature actuating it.

The chamber 22 is preferably located so that it is continuously sprayed in operation by the hot gases passing up the fuel channels 11, and may be of any suitable heat-conducting material.

The vessel 23 may conveniently be located in a channel in the reactor core, so that it can be cooled by reactor gas passing up the fuel channels and so that it can be removed easily from the core in the event of failure.

The sensitivity of the system, that is to say the rate of change of reactivity of the system with respect to the gas outlet temperature $T_2$, is dependent on the volume of gas in the system: the greater the gas volume the greater the sensitivity. It is therefore desirable to have as large a volume of gas as possible in the control system: but at the same time only a limited volume of neutron-absorbing gas is desirable in the core. This is the reason for using carbon dioxide gas in the chamber 23 in the example shown in FIG. 2; the carbon dioxide is free to undergo the same changes in pressure and temperature as is the boron trifluoride gas in the chamber 23a, by virtue of the bellows 24 between them, but the carbon dioxides does not absorb neutrons at a significant rate compared with boron trifluoride. Therefore gases having this property of low absorption rate, and which are compatible with the materials with which they come into contact, are also suitable for use in the chamber 23b.

Any suitable flexible device may be used in the vessel 23 to separate the chambers 23a and 23b; the bellows 24 are one example, but a diaphragm for instance may be used instead.

A vessel similar to the vessel 23, divided by a flexible device into two chambers, may be used also in connection with the system shown in FIG. 1, the duct 14 then communicating with the smaller chamber.

Systems of reactivity control such as those described herein can be applied to substantially all kinds of nuclear reactor, for example liquid-moderated and/or liquid cooled reactors. For example, in the system shown in FIG. 1 the valve 17 need not be responsive only to temperature, but can be made responsive to any desired quantity in the reactor or in the control system; for example, instead of the thermocouple 20 a thermal column may be provided, making the valve responsive to neutron flux in the reactor.

If the reactor is of the boiling water type, arranged to supply steam to a steam turbine through a stop valve, the valve 17, in the example shown in FIG. 1, may be operated by an actuating device responsive to electrical output signals from a pressure switch or other pressure-sensitive device arranged to respond to changes in steam-pressure at the stop valve.

Boron trifluoride is only one example of a suitable gas for use as control gas: for example, helium, $He_2$, or nitrogen may be used instead.

What we claim as our invention and desire to secure by Letters Patent is:

1. In a nuclear reactor comprising a moderator core, nuclear fuel within said core, reactivity control means comprising an enclosed gas-containing first vessel within said core, a variable-volume gas-containing second vessel within said first vessel, a gas-containing third vessel outside said core, duct means connecting together said second and third vessels, a first gas within said first vessel but outside said second vessel and outside said duct means, a neutron-absorbing second gas within said second and third vessels and said duct means, said first gas being of substantially lower reactivity than said second gas, and means for causing the density of said second gas to vary in response to changes in a reactor condition so as to cause corresponding changes in the rate of absorption of neutrons by said second gas to take place such as to nullify the said changes in the reactor condition, so that said second vessel can change in volume in response to said density variation of said second gas whereby to maintain said first and second gases at substantially the same pressure as each other.

2. In a nuclear reactor comprising a moderator core, nuclear fuel within said core, reactivity control means comprising an enclosed gas-containing first vessel within said core, a variable-volume gas-containing second vessel within said first vessel, a gas-containing third vessel outside said core, duct means connecting together said second and third vessels, a first gas within said first vessel but outside said second vessel and outside said duct means, boron trifluoride gas within said second and third vessels and said duct means, said first gas being of substantially lower reactivity than said boron trifluoride gas, and means for causing the density of said boron trifluoride gas to vary in response to changes in a reactor condition so as to cause corresponding changes in the rate of absorption of neutrons by said boron trifluoride gas to take place such as to nullify the said changes in the reactor condition, so that said second vessel can change in volume in response to said density variation of said boron trifluoride gas whereby to maintain said gases at substantially the same pressure as each other.

References Cited by the Examiner

UNITED STATES PATENTS

| | | | |
|---|---|---|---|
| 2,979,450 | 4/1961 | Dusbabek | 176—22 |
| 3,025,228 | 3/1962 | Whitelaw | 176—22 |
| 3,130,128 | 4/1964 | Spillman | 176—86 |

FOREIGN PATENTS

| | | |
|---|---|---|
| 887,392 | 1/1962 | Great Britain. |
| 897,889 | 5/1962 | Great Britain. |

OTHER REFERENCES

Schultz: "Control of Nuclear Reactors and Power Plants," pages 321–326, 1961, publ. by McGraw-Hill.

Nucleonics, vol. 13, No. 8, August 1955, pages 30–33, "Using $BF_3$ for Reactor Control," by Cawley.

REUBEN EPSTEIN, *Primary Examiner.*

CARL D. QUARFORTH, *Examiner.*

M. R. DINNIN, *Assistant Examiner.*